Sept. 22, 1953     LE ROY R. MALECK     2,652,747
EYEGLASSES FRAME WITH SPRING BIASED TEMPLE ARMS
Filed July 13, 1950
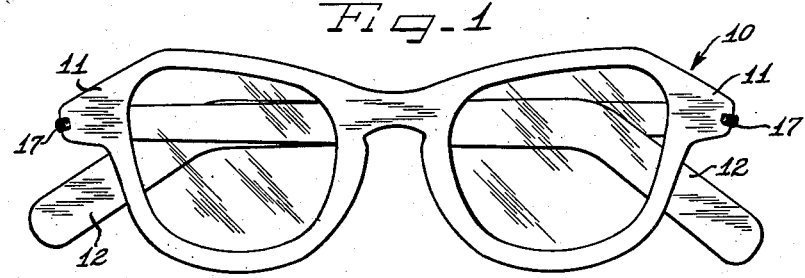
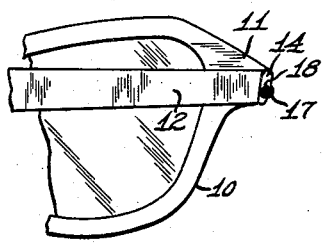 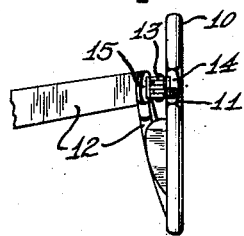
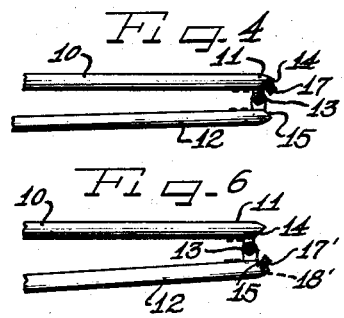 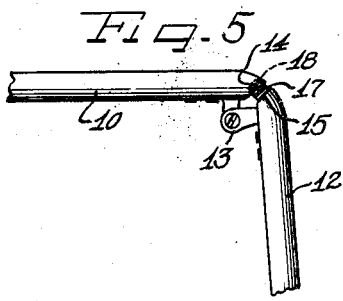
Inventor
LeRoy R. Maleck Patented Sept. 22, 1953

2,652,747

UNITED STATES PATENT OFFICE 2,652,747

EYEGLASSES FRAME WITH SPRING BIASED TEMPLE ARMS

Le Roy R. Maleck, Chicago, Ill.

Application July 13, 1950, Serial No. 173,491

3 Claims. (Cl. 88—53)

1

The present invention relates to improvements in ophthalmic mountings and more particularly to such mountings having foldable temple-engaging arms.

In eyeglass frames having slip-on type temple-engaging arms, a commonly experienced problem has been that of maintaining such a close adjustment on the temple gripping action of the slip-on arms as to prevent slipping of the glasses out of position on the wearer's face. Any one who has ever worn this type of glasses has experienced slipping of the frame outwardly and downwardly on his nose by reason of failure of the temple arms to maintain an adequate grip which would prevent such sliding or displacement of the frame.

An important object of the present invention is to provide an eyeglass frame equipped with slip-on temples which are spring biased to maintain continuously a yieldable though positive grip on the wearer's head.

An important object of the invention is to provide improved spring biasing means which is effective between an eyeglass frame and a temple arm thereon for biasing the temple arm when in use toward improved gripping engagement with the wearer's head.

A further object of the invention is to provide improved temple arm biasing means for eyeglass frames which can be provided as original equipment or which may be applied as accessory equipment for existing eyeglass frames.

Still another object of the invention is to provide improved eyeglass temple biasing means which are effective in operation, simple to install and of low cost.

Other objects, features and advantages of the present invention will be readily apparent from the following detailed description of certain preferred embodiments thereof taken in conjunction with the accompanying drawings, in which:

Figure 1 is a front elevational view of a pair of eyeglasses and a frame carrying the same, with slip-on temple arms illustrated in folded condition and equipped with temple arm biasing means according to the present invention;

Figure 2 is a fragmentary rear elevational view of one side of the eyeglass frame;

Figure 3 is an end elevational view of the eyeglass frame;

Figure 4 is a fragmentary top plan view of one side of the eyeglass frame;

Figure 5 is a slightly enlarged top plan view similar to Fig. 4 but showing the temple arm in open position; and

2

Figure 6 is a fragmentary top plan view of a similar eyeglass frame showing a modified arrangement of the temple arm biasing spring.

The present invention has a special utility in plastic eyeglass frames which are quite extensively used at the present time. A frame 10 of this type, as shown in Figs. 1, 2 and 3, comprises the usual lens-supporting loops connected by a nose bridge and with laterally projecting bosses 11 at the respective outer sides of the lens-supporting loops. Respective slip-on temple arms 12 are hingedly attached to the bosses 11 by means of appropriate spring structures 13.

Each of the bosses 11 has a shoulder 14 which opposes a complementary heel 15 on the associated temple arm for limiting opening movement of the temple arm. It is customary in fitting a pair of glasses to a user's requirements, to bend the temple arms to effect reasonably snug engagement with the sides of the user's head for holding the glasses in place. However, for various reasons or due to various variable conditions arising from time to time, looseness in the fit of the temple arms develops.

According to the present invention looseness in the engagement or grip of the temple arms against the user's head is permanently avoided by the provision of spring biasing means which imparts a yieldable but positive head-gripping bias to the temple arms. For this purpose a small coiled compression spring 17 is interposed between the stop shoulder 14 and the heel 15 of each of the temple arms. As shown in Figs. 1 to 5, inclusive, the biasing spring 17 is mounted retainingly in a socket 18 in the shoulder 14 of the frame and with the free end portion of the spring projecting substantially beyond the face of the shoulder 14 for engagement with the heel 15 of the temple when the temple is in open position. As best seen in Figure 4, the socket 14 is only a small fraction as deep as the length of the spring 17 so that the major length of the spring projects from and beyond the face of the shoulder generally toward the heel of the temple arm. As a result, when the temple 12 is moved into open position as seen in Fig. 5, the associated biasing spring 17 is compressed by the heel 15 of the temple and the spring is therefore placed under compression and reacts to effect a bias against the heel of the temple tending to move it toward its collapsed condition so that the temple is urged into positive though yieldable engagement with the side of the wearer's head.

It will be observed in Figure 5, that in the open relation of the frame and the temple arm, the respective shoulder and heel surfaces are spaced apart with the compressed coil spring 17 exposed therebetween. Since the major portion of the spring 17 projects beyond the surface of the shoulder 14, by reason of the shallowness of the socket 18, even when the spring is fully compressed it will remain in substantial projecting relation beyond the surface of the shoulder and thereby serve as a spacer between the shoulder and the opposing heel surface to maintain them spaced apart.

Mounting of the coiled biasing spring 17 is easily accomplished by simply drilling a hole to provide the socket 18 in the shoulder 14 and of a diameter to have a strong pressed fit engagement with the end portion of the spring.

If preferred, the arrangement shown in Fig. 6 may be utilized wherein a coiled compression spring 17′ is mounted in a socket 18′ provided in the face of the heel 15 of the temple 12 rather than in the stop shoulder 14 of the eyeglass frame boss 11. The operation of this form of the invention is productive of the same results as where the biasing spring is mounted on the stop shoulder of the frame.

It will be understood that modifications and variations may be effected without departing from the scope of the novel concepts of the present invention.

I claim as my invention:

1. In combination in an eyeglass frame and temple arm assembly, an eyeglass frame having at one end a temple arm supporting portion including an oblique surface providing a stop shoulder facing generally toward the inner side of the frame and endwise, a temple arm, said temple arm having an end surface providing a stop shoulder oblique to the axis of the temple arm and generally complementary to and facing generally toward said stop shoulder on the frame, hinge means connecting the frame and temple arm and having its axis adjacent to said shoulders, said axis being substantially aligned with and parallel to said shoulders, one of said shoulders having a socket therein on an axis normal to such shoulder, and a coiled compression spring of a length to project beyond said socket and having an end portion secured in said socket so that the spring will not escape from the socket, said spring projecting substantially beyond the socketed shoulder and being releasably engageable at its projecting end by the other of said shoulders for compression of said spring when the temple arm is swung open, whereby to bias the temple arm toward collapsed relation for maintaining a positive resilient grip on the side of a wearer's head.

2. An eyeglass frame and temple arm assembly as defined in claim 1 wherein the socket is a hole drilled into the socketed shoulder and the end of the spring within the socket is press fitted in the socket.

3. An eyeglass frame and temple arm assembly as defined in claim 1 wherein the major length of the spring projects beyond the socketed shoulder and when the spring is fully compressed it will remain in substantial projecting relation beyond the socketed shoulder and serve as a spacer between the shoulders to maintain them spaced apart.

LE ROY R. MALECK.

References Cited in the file of this patent

UNITED STATES PATENTS

| Number | Name | Date |
|---|---|---|
| 1,942,298 | Le Doux | Jan. 2, 1934 |
| 2,026,723 | Wollensak | Jan. 7, 1936 |

FOREIGN PATENTS

| Number | Country | Date |
|---|---|---|
| 916 | Great Britain | Apr. 21, 1854 |
| 381,604 | Great Britain | Oct. 10, 1932 |
| 162,502 | Switzerland | June 30, 1933 |
| 344,817 | Italy | Nov. 25, 1936 |